United States Patent [19]

Elliot et al.

[11] 4,189,026
[45] Feb. 19, 1980

[54] UNDERWATER GENERATION OF LOW FREQUENCY SOUND

[75] Inventors: Myron A. Elliot, Lynn Haven; Robert H. Forbus, Panama City, both of Fla.

[73] Assignee: The United States of America as represented by the Secretary of the Navy, Washington, D.C.

[21] Appl. No.: 403,947

[22] Filed: Jan. 13, 1954

[51] Int. Cl.² ............................ G01V 1/06; G01V 1/38
[52] U.S. Cl. .................................... 181/118; 181/115; 367/145
[58] Field of Search .................. 340/12; 181/115, 118

[56] References Cited
U.S. PATENT DOCUMENTS

| 1,500,243 | 7/1924 | Hammond | 340/12 R |
|---|---|---|---|
| 2,679,205 | 5/1954 | Piety | 181/118 |

*Primary Examiner*—Nelson Moskowitz
*Attorney, Agent, or Firm*—George Sipkin; Rolla N. Carter

EXEMPLARY CLAIM

1. A device for underwater generation of low frequency sound comprising a conically shaped explosion chamber open at both ends, a firing chamber having inlet and outlet passages at opposite ends thereof, ignition means in the firing chamber, a restricted orifice between the outlet passage of the firing chamber and the small open end of the explosion chamber, a mixing chamber opening into said inlet passage, and two supply lines for introducing gases to form a combustible mixture in the mixing chamber, the combined resistance the supply lines and the mixing chamber offer to the flow of gas in the upstream direction being slightly greater than the flow resistance of said restricted orifice, the arrangement being such that when the gases in the firing chamber are ignited with the device submerged in water the flame spreads down stream through the explosion chamber and also upstream into the supply lines thereby extinguishing the flame.

5 Claims, 6 Drawing Figures

UNDERWATER GENERATION OF LOW FREQUENCY SOUND

The invention described herein may be manufactured and used by or for the Government of the United States of America for governmental purposes without the payment of any royalties thereon or therefor.

The present invention relates to underwater noise-making and more particularly to the underwater generation of low frequency sound of high intensity by the combustion of explosive mixtures of gases in an explosion chamber open to the water at its bottom.

The sweeping of acoustic mines requires high intensity sounds of frequencies down to as low as 10 cycles per second. Mechanical low frequency noise makers have had considerable use and are efficient within their limitations; however, they become excessively large and expensive if they are made capable of producing the intensities and frequencies required for satisfactory sweeping of low frequency acoustic mines. In addition, they are quite vulnerable to the explosion of nearby mines so that to the extent they are successful they are also expendable. Other types of noisemakers which have proven practical for certain special purpose minesweeping utilize as the energy source the explosion of solids, but these types have been found to be too expensive for routine sweeping. Attempts have been made to design open type explosion chambers for obtaining underwater sound from the explosion of gases, but they have proven unsuccessful because of being either too inefficient or erratic and unstable.

In accordance with the present invention an explosion chamber open at its bottom to the water is connected upstream serially through a restricted passageway, a firing chamber, and a labyrinthic mixing chamber to lines which supply under constant pressure separate gases forming a combustible gas mixture, the arrangement being such that when the gases are ignited in the firing chamber the flashback of the burned gases up the supply lines functions to extinguish the flame after each explosion. For maximum output it appears to be necessary to synchronize the repetition rate of ignition with the frequency of oscillation of the gas bubble formed by successive explosions. This rather sharp resonance indicates that the system is operating somewhat on the principle of a two stroke cycle internal combustion engine in which the piston and flywheel are replaced by the oscillating gas bubble, the natural frequency of which is a function of the energy of the explosion, the volume of gas associated with the explosion, the depth under water, and the hydraulic inductance between the point of the explosion and the open water.

An object of the present invention is to make possible the controlled generation under water of low frequency noise of the high intensity required for minesweeping purposes.

Another object of the invention is the provision of an explosive type underwater noisemaker utilizing a combustible gas mixture and wherein no valves are required.

A further object of the invention is the provision of an explosive type underwater noise generator which can be modulated in frequency and amplitude over a range useful in acoustic minesweeping.

Other objects and advantages of the invention as well as the invention itself will be appreciated from the following description when read in connection with the accompanying drawing in which.

Figure 1:
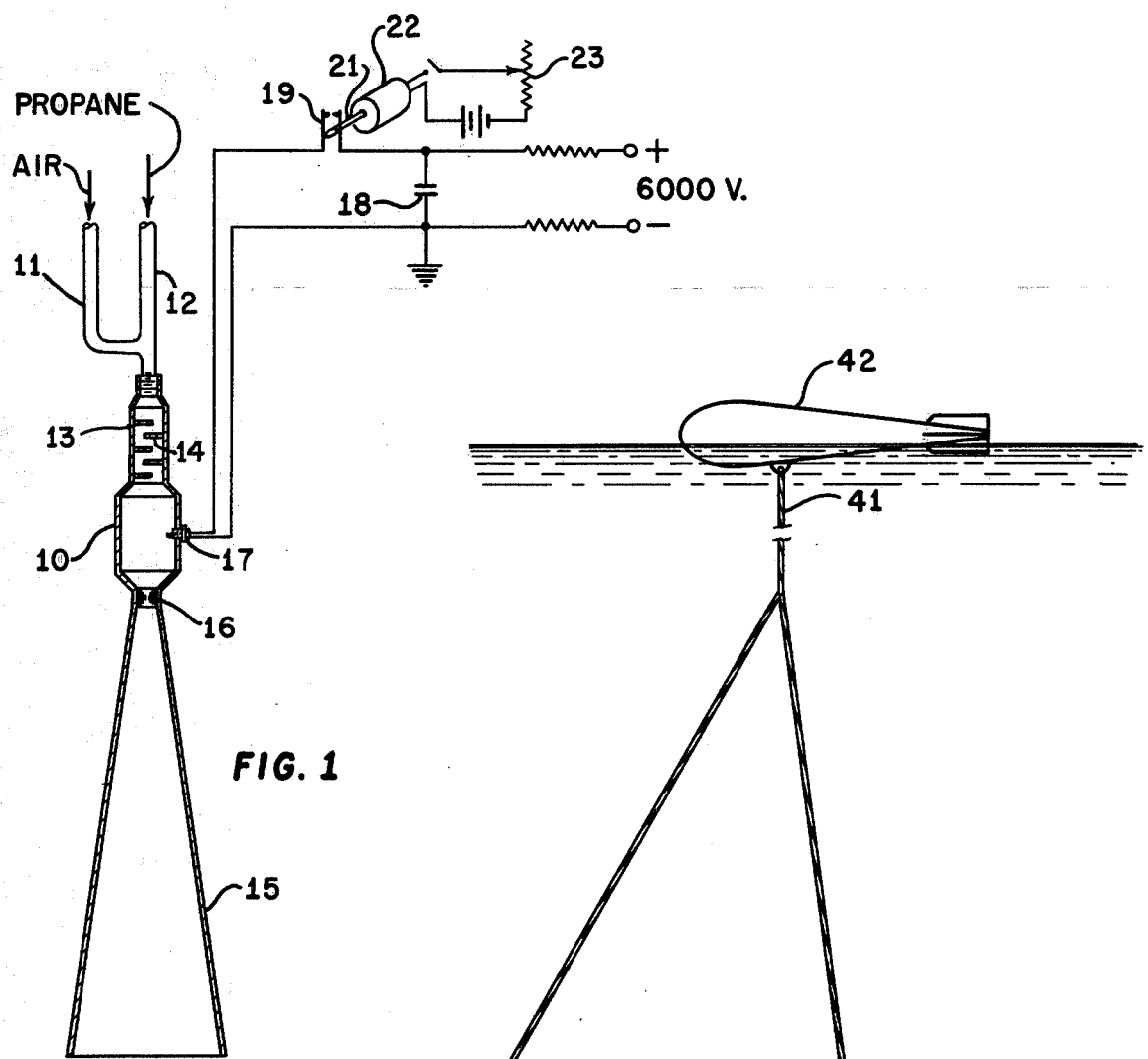
FIG. 1 is a vertical sectional view of an apparatus incorporating the invention.

As shown in FIG. 1 the noise generating device includes a firing chamber 10 connected to supply lines 11 and 12 through a mixing chamber 13 which is so constructed as by the provision of baffles 14 as to offer, in addition to their gas mixing function, a selected resistance to the flow of gas. As indicated in the drawing the gases furnished through the supply lines 11 and 12 may comprise air and propane, respectively. On the down stream side the firing chamber 10 connects to an explosion chamber 15 through a restricted orifice 16. A spark plug 17 in the wall of the firing chamber 10 for igniting the gas mixture is adapted to be connected periodically in the discharge path of a capacitor 18 through a suitable switch 19 which may take the form of two leaf springs biased to circuit closing position and adapted to be opened as by the elliptical shaft 21 of a motor 22. The motor 22 is preferably of a variable speed type, as indicated by the adjustable resistance 23 in its energizing circuit, so that the ignition rate may be controlled by the operator.

When the combustible gas mixture is ignited in the firing chamber 10 by the spark plug 17 the expanding gases flow through the restricted orifice 16 into the explosion chamber 15 and also back (flashback) through the baffled restriction 13 into the supply lines 11 and 12 thereby extinguishing the flame. This flashback up the feed lines is important in that if it is too much the operation of the device is very inefficient, while if it is too little the operation is erratic and unstable. Assuming a given resistance, $R_1$, to gas flow in the mixing chamber 13 and the feed lines, then the flashback is determined by the amount of the resistance $R_2$ offered by the orifice 16 between the firing chamber 10 and the explosion chamber 15, and the volume $V_1$ of the firing chamber. The volume $V_1$ is determined approximately by the volume $V_2$ chosen for the explosion chamber 15, the ratio $V_2/V_1$ being about fifteen for optimum operation, although values from five to fifty are operable. The volume $V_2$ is determined by the resonant frequency $f_o$ desired in the acoustic output. For operating at a depth of 30 feet under water $f_o$ is approximately given by the empirical relationship: $\log x + 0.27 \log y = 1.17$, where x is the numerical value of $f_o$ when $f_o$ is expressed as cycles per second and y is the numerical value of $V_2$ when $V_2$ is expressed as cubic feet. If, for example, it is desired to operate at a frequency of 20 cycles per second $V_2$ is calculated to be 0.33 cubic feet. As an example of the resistance $R_2$ an orifice 16, two and one-half inches long and one and three-eighths inches in diameter gave a proper value of $R_2$ for the explosion chamber operating at a resonant frequency of 20 cycles per second. $R_1$ should have a value somewhat greater than the value of $R_2$. It should be pointed out that optimum values for $R_1$ and $R_2$ do not vary much for different size explosion chambers. The conical horn comprising the explosion chamber 15 is preferably of low taper to permit efficient scavenging of burnt gases and in the above example the explosion chamber 15 should be about three feet long.

Figure 2:
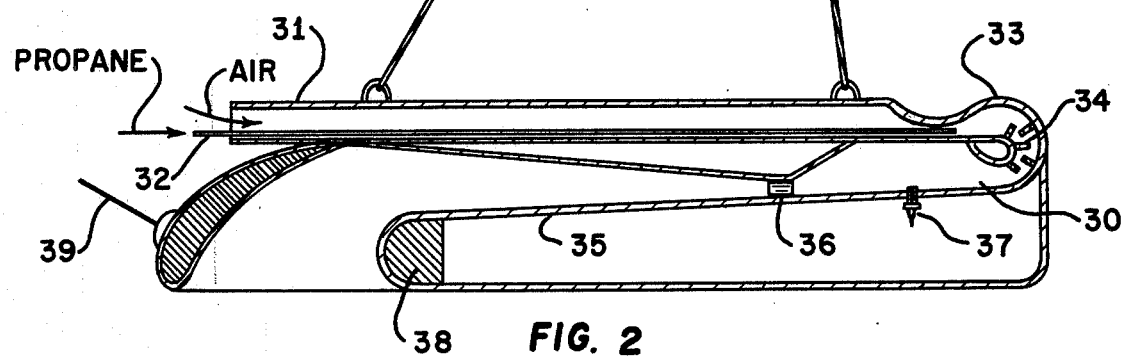
FIG. 2 is a vertical section showing the invention incorporated in an embodiment specially adapted for underwater towing.

The embodiment of the invention illustrated in FIG. 2 differs from the one above described mainly by being streamlined for underwater towing. As here shown the firing chamber 30 is supplied with a combustible mixture of gases from an air line 31 and a fuel line 32 through a mixing chamber 33 provided with baffles 34 for assuring thorough mixing as well as for furnishing part of the resistance, $R_1$, for controlling flashback. The horn shaped explosion chamber 35 connects to the firing chamber 30 through a restricted passageway 36. The device is folded on itself with the 180° turn made in the mixing chamber 33 and a 90° turn in the explosion chamber 35 near its end provides the required downwardly directed feature. The sparkplug 37 for igniting the gas in the firing chamber 30 may be powered as shown in FIG. 1. The rim of the horn at the outer end of the explosion chamber 35 may be surrounded with metal 38 for weighting and strengthening purposes. The entire assembly may be towed through water by a tow line 39 and at a depth determined by the length of the supporting line 41 leading to a float 42. It will of course be understood that the device in the form shown in FIG. 1 may be towed under water if suitable provision is made for maintaining it substantially in the vertical position, one arrangement which has been found to function satisfactorily being simply the suspension of a weight from the lower end of the explosion chamber 15.

Inasmuch as the noisemaker of the invention is designed to operate under water at a depth of 30 feet or more, it is very difficult to ascertain the exact mode of operation. However, from measurements which have been taken it seems certain that an oscillation is set up having a natural frequency dependent upon the ratios of the parameters, $R_2/R_1$ and $V_2/V_1$, and the shape of the explosion chamber. Due to the fact that an oscillation is present it is possible to time the ignition rate so that an explosion takes place every other cycle or every third cycle; however, the sound level diminishes because the oscillation is highly damped and for maximum sound output it is preferred to ignite the gas every cycle. It is also possible to vary the ignition rate by a few cycles a second without greatly diminishing the sound output and use can be made of this fact for obtaining a limited amount of frequency modulation. Amplitude modulation can be obtained by varying the ignition rate still further from the resonant rate and it is preferred to obtain amplitude modulation by this method rather than by igniting only every other or every third cycle.

In use the device is submerged in water to the desired depth with the large end of the conical explosion chamber directed downwardly. The gases used to form the combustible mixture are furnished through the supply lines from any suitable source such as pressure tanks on board the ship using the device at a pressure from between 5 to 10 pounds per square inch above the hydrostatic head at the device. The gases at this pressure force the water out of the device after which the ignition system is energized to initiate the first cycle of an operation which can continue as long as desired simply by maintaining the supply of gases. The ignition rate is varied until maximum output is obtained and thereafter may be varied to provide considerable amplitude modulation and a limited amount of frequency modulation in accordance with the theory of operation outlined above.

Figure 3:
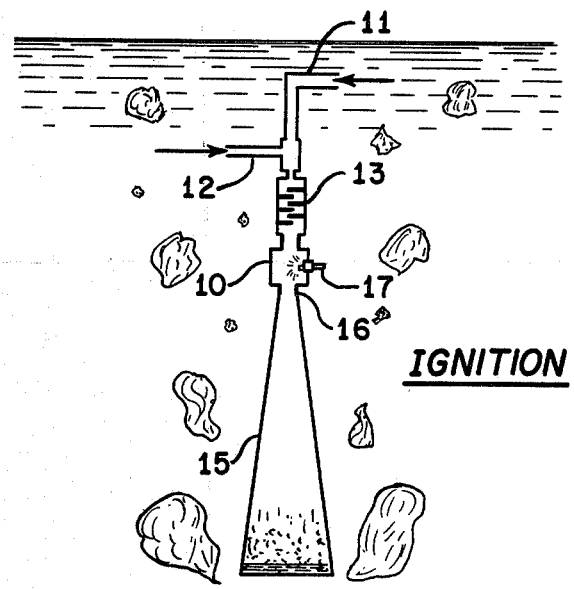
FIGS. 3 to 6 show schematically four stages of an explosion cycle.
Figure 4:
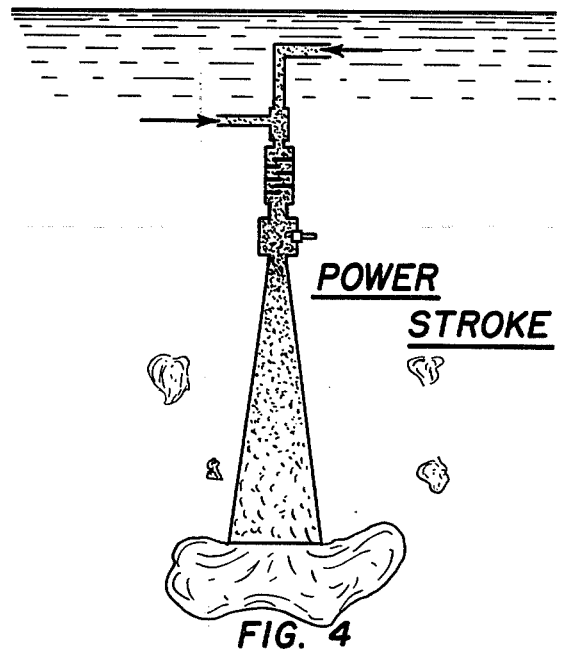
Figure 5:
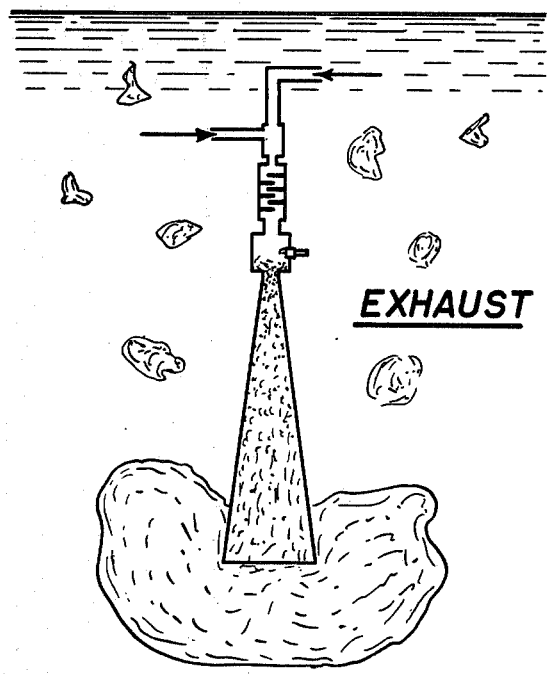
Figure 6:
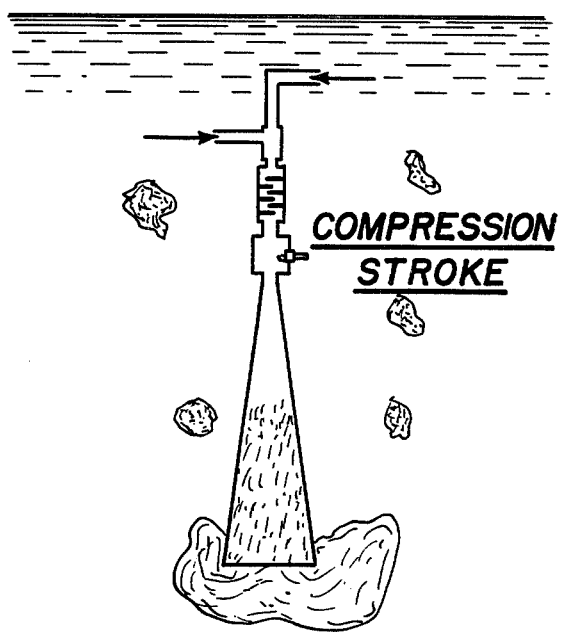

The manner in which the noisemaker is believed to operate will now be described in connection with FIGS. 3 to 6, wherein like reference characters denote corresponding parts of the device shown in FIG. 1. It will be understood that the FIGS. 3 to 6 are highly schematic and that in each instance the device is submerged a substantial distance below the surface of a body of water such as for example thirty feet. Assuming that the noisemaker is operating and has just reached the ignition stage of an explosive cycle it will be seen, as indicated in FIG. 3, that spent gases from the previous explosion are rising to the surface, the water has entered the open end of the explosion chamber 15 for a short distance such as three to five inches and that fresh gas entering through lines 11 and 12 fills the remainder of the device with the exception of a small amount of residual exhaust gases in the lower end of the explosion chamber. Thus FIG. 3 indicates that the bubble has collapsed to its nadir and the pressure is at approximately its highest point when ignition takes place. Upon ignition of the gases in the firing chamber 10 the flame rapidly spreads to the explosive chamber 15 and due to the resistance offered by the restricted orifice 16 the burned gases are forced through the mixing chamber 13 and a short distance up the supply lines 11 and 12 to extinguish the flame. It will be understood that in addition to the resistance of the mixing chamber 13 the pressure of the gases in the supply lines 11 and 12 also aid in keeping the burned gases from going too far up the supply lines. The burning of the gas in the explosion chamber 15 comprises the power stroke of the cycle and the flame shooting out of the chamber expands the gas bubble as indicated. The momentum of the gases and the water continue to expand the bubble which action coupled with the onrush of fresh gas brings the gas bubble to its greatest size and the gas pressure in the bubble to its lowest point. This stage of the cycle is indicated in FIG. 5 and may be considered an exhaust stage. Due to the fact that the gas bubble over-expanded the resulting reduced pressure scavenges the exhaust gas, at least to a considerable extent, from the explosion chamber 15 so that as the gas bubble contracts most of the exhaust gas is released to the water and replaced by fresh gas. This action may be termed the compression stroke as indicated in FIG. 6. At the end of the compression stroke the bubble has collapsed to its greatest extent and the pressure has increased to its highest point and is ready to start a fresh ignition cycle as indicated in FIG. 3.

While for the purpose of disclosing the invention a particular structure has been described which has been found useful in the generation of underwater sound and employing a readily available and relatively inexpensive fuel, it is to be understood that other gases which will form an explosive mixture may be employed. In this connection it should be pointed out that other gases having different explosive characteristics will require altering the relative values of $R_1$, $R_2$, $V_1$ and $V_2$ to obtain optimum operation. However, the basic structure and mode of operation will remain the same as it is intended that the appended claims include within their scope all modifications which will occur to those skilled in the art after reading the present disclosure.

What is claimed as new and desired to be secured by Letters Patents of the United States is:

1. A device for underwater generation of low frequency sound comprising a conically shaped explosion chamber open at both ends, a firing chamber having inlet and outlet passages at opposite ends thereof, ignition means in the firing chamber, a restricted orifice between the outlet passage of the firing chamber and the small open end of the explosion chamber, a mixing chamber opening into said inlet passage, and two supply lines for introducing gases to form a combustible mixture in the mixing chamber, the combined resistance the supply lines and the mixing chamber offer to the flow of gas in the upstream direction being slightly greater than the flow resistance of said restricted orifice, the arrangement being such that when the gases in the firing chamber are ignited with the device submerged in water the flame spreads down stream through the explosion chamber and also upstream into the supply lines thereby extinguishing the flame.

2. The device of claim 1 in which the terminal portions of the supply lines are mounted on top of and parallel horizontally alined firing and explosion chambers, the mixing chamber is bent 180° on a short radius, and the explosion chamber has a downwardly vented cowled end.

3. A device for underwater generation of low frequency sound comprising a conically shaped explosion chamber open at both ends, a firing chamber having inlet and outlet passages at opposite ends thereof, ignition means in the firing chamber, a restricted orifice between the outlet passage of the firing chamber and the small open end of the explosion chamber, a mixing chamber opening into said inlet passage, supply lines for introducing gases to form a combustible mixture in the mixing chamber, whereby an oscillating gas bubble is produced when the gases in the firing chamber are ignited with the device submerged in water, and means for actuating the ignition means at a rate approximately equal to the natural frequency at which the gas bubble oscillates.

4. The device of claim 3 in which the ignition actuating means is adjustable for varying its rate to provide modulation of the sound generated.

5. The device of claim 3 further characterized in that the conical explosion chamber is of low taper such that its half angle is approximately five degrees.

* * * * *